US008864029B2

(12) United States Patent
McGlamery et al.

(10) Patent No.: US 8,864,029 B2
(45) Date of Patent: Oct. 21, 2014

(54) METHOD AND SYSTEM FOR EXCEPTION PROCESSING OF MICR DOCUMENTS

(71) Applicant: Bank of America Corporation, Charlotte, NC (US)

(72) Inventors: David Craig McGlamery, Mooresville, NC (US); Kathryn G. Harrington, Fort Mill, SC (US); Russell M. Parsons, Chester, SC (US); Raymond Glenn Beichler, Fallston, MD (US)

(73) Assignee: Bank of America Corporation, Charlotte, NC (US)

( * ) Notice: Subject to any disclaimer, the term of this patent is extended or adjusted under 35 U.S.C. 154(b) by 215 days.

(21) Appl. No.: 13/672,060

(22) Filed: Nov. 8, 2012

(65) Prior Publication Data

US 2013/0112748 A1    May 9, 2013

Related U.S. Application Data

(63) Continuation of application No. 10/905,253, filed on Dec. 22, 2004, now abandoned, and a continuation-in-part of application No. 10/707,669, filed on Dec. 31, 2003, now Pat. No. 7,165,723.

(51) Int. Cl.
*G06K 7/08* (2006.01)
*G06K 9/03* (2006.01)

(52) U.S. Cl.
CPC .................................. *G06K 9/03* (2013.01)
USPC .................................. 235/449; 235/493

(58) Field of Classification Search
CPC ... G07D 7/0033; G07D 7/20; G07D 11/0066; G07D 11/0084; G07D 7/12; G07D 7/00; G07D 7/2025; G06Q 20/042; G06Q 40/00; G06Q 10/00; G06Q 20/10; G06Q 20/108; G06Q 30/0185; G06Q 40/10; G06K 9/03; G06K 9/2018; G06K 209/0059; G06K 2209/01; G06K 9/00483; G06K 9/033; G07F 19/20; G07F 19/202; G07F 19/207; G07F 7/04
USPC .................. 235/382, 380, 379, 375, 449, 493
See application file for complete search history.

(56) References Cited

U.S. PATENT DOCUMENTS 3,737,628 A    6/1973   Azure, Jr.
4,417,136 A   11/1983   Rushby et al.

(Continued)

FOREIGN PATENT DOCUMENTS

EP    0 671 696 A1    9/1995
JP    9-282387 A     10/1997

OTHER PUBLICATIONS

Canadian Office Action dated Oct. 30, 2012 for Application No. 2,546,849.

(Continued)

*Primary Examiner* — Thien M Le
(74) *Attorney, Agent, or Firm* — Michael A. Springs; Moore & Van Allen PLLC; Nicholas C. Russell

(57) ABSTRACT

MICR documents are read and sorted to a destination pocket for processing subject to a determination that an exception does not prevent the routing of the document. In example embodiments, for example, an error does not prevent the routing of the document if it is not related to the routing/transit field. In the case of digit errors, an optical character recognition (OCR) process is performed on the stored, electronic image of the document to correct digit errors in the stored data read from the documents. If a determination is made that correction or other exception processing cannot be handled through the OCR process, the image and corresponding MICR data is displayed on a user terminal, for manual verification or correction by reference to an image of the document, rather than the document itself.

24 Claims, 7 Drawing Sheets

FIG. 2

(56) References Cited

U.S. PATENT DOCUMENTS

| | | |
|---|---|---|
| 4,523,330 A | 6/1985 | Cain |
| 4,555,617 A | 11/1985 | Brooks et al. |
| 5,007,100 A | 4/1991 | D'Aoust et al. |
| 5,257,328 A | 10/1993 | Shimizu |
| 5,678,046 A | 10/1997 | Cahill et al. |
| 5,679,940 A | 10/1997 | Templeton et al. |
| 5,740,271 A | 4/1998 | Kunkler et al. |
| 5,754,673 A | 5/1998 | Brooks et al. |
| 5,917,965 A | 6/1999 | Cahill et al. |
| 5,940,844 A | 8/1999 | Cahill et al. |
| 5,963,659 A | 10/1999 | Cahill et al. |
| 6,181,837 B1 | 1/2001 | Cahill et al. |
| 6,351,553 B1 | 2/2002 | Hayosh |
| 6,574,377 B1 | 6/2003 | Cahill et al. |
| 7,092,561 B2 | 8/2006 | Downs, Jr. |
| 2001/0051921 A1 | 12/2001 | Garner, IV et al. |
| 2004/0133516 A1 | 7/2004 | Buchanan et al. |

OTHER PUBLICATIONS

International Preliminary Report on Patentability for International Application No. PCT/US2004/043832 dated Jul. 3, 2006.

International Search Report for International Application No. PCT/US2004/043832 dated May 19, 2005.

Written Opinion for International Application No. PCT/US2004/043832 dated May 19, 2005.

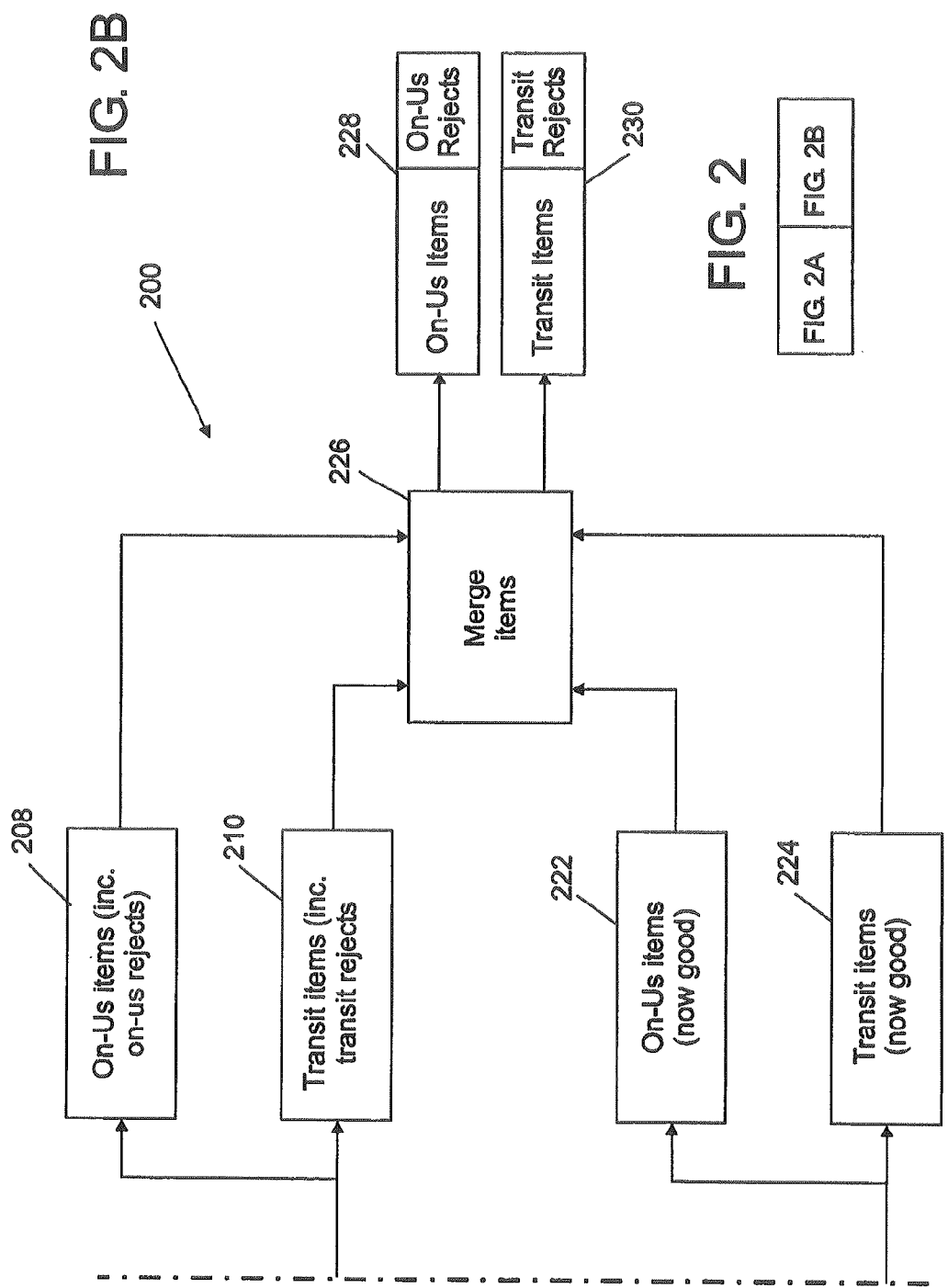

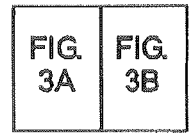
FIG. 3
FIG. 3B
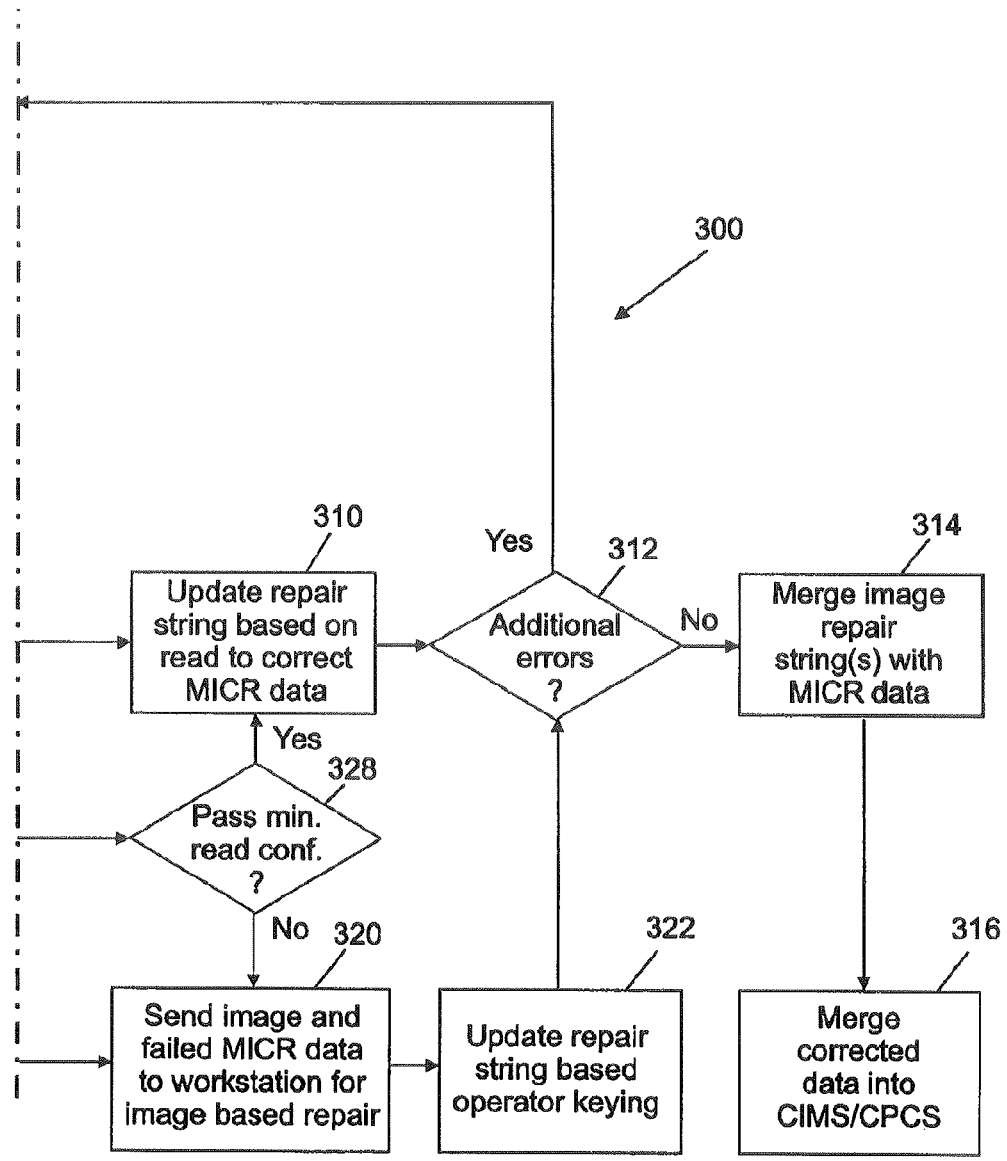

METHOD AND SYSTEM FOR EXCEPTION PROCESSING OF MICR DOCUMENTS

CROSS-REFERENCE TO RELATED APPLICATION

This Non-provisional patent application claims priority to U.S. patent application Ser. No. 10/905,253, filed Dec. 22, 2004, entitled "Method and System for Exception Processing of MICR Documents" which is a continuation-in-part of and claims priority from U.S. patent application Ser. No. 10/707,669, issued as U.S. Pat. No. 7,165,723, filed Dec. 31, 2003, entitled "System and Method for the Processing of MICR Documents that Produce Read Errors." Each of which assigned to the assignee hereof and hereby expressly incorporated by reference herein.

BACKGROUND OF INVENTION

Financial institutions have established various processes and associations related to the exchange of documents evidencing monetary transactions. Such documents are generally encoded with magnetic ink so that information from the documents can be read by machine. Such documents have thus become known as magnetic ink character recognition (MICR) documents. Check processing and sorting systems have also been developed in which a check or similar MICR document has its image captured and stored electronically. Such an image can be archived so that it is indexed or joined with its accompanying data from a MICR read. In addition, up until now, MICR documents have also been captured photographically for storage in microfilm format. This feature is being removed as electronic image processing and retrieval replaces the use of microfilm.

The typical high-speed processing of documents having MICR data, for example, checks, includes reading and storing a MICR line, endorsing the document with applicable information, imaging the item so that the image can be stored in an archive facility, and sorting items for processing. Items for which the MICR reads properly, and for which no errors are detected in the data, sort to pockets for routine processing. Any items with a failed MICR read or an exception are typically sorted to a reject pocket and are handled through an exception process. The exception process typically includes attempting to read the MICR with an alternate, slower type of reader to achieve a better read rate, and if that fails, manually reviewing the paper document and keying in the appropriate data.

FIG. 1 is a flow chart which illustrates the current process for processing MICR documents at many financial institutions. In FIG. 1, various steps in the process are represented by process blocks. Process blocks can also represent stopping points or paths for different types of items. At block 102, items with MICR data are loaded into a high-speed processor. The MICR data on the item is recognized and captured by a read head. The data is transferred to a file for storage with indicators that signify which fields have apparently read correctly, and which ones have failed to read. Logic failures are also detected. A logic failure occurs when data has apparently been captured successfully, but makes no sense, so it must be assumed that the data as captured is erroneous. At block 102 of FIG. 1, items also typically pass through an endorsement feature, which typically puts a date, location of scan, and other data related to the financial institution performing the processing. The item optionally can move through a microfilm unit to have a photographic image captured. Next, the item moves under and over image scanners. An image of the item (front and back) is created and stored.

At block 104, based on the read of the document, instructions are executed regarding the disposition of the item. All items with read failures or logic issues are passed to a reject pocket at block 106. A correction process then takes place at block 108. Where an item reads good, with good data, at block 104, the item goes through high speed pocketing at block 110. In a typical check processing environment, based on the read of the MICR data, items are sorted into pockets as "on-us" items, as shown at block 112, or "transit" items, as shown at block 114. An on-us item is an item that is drawn on the financial institution doing the processing. On-us items will typically be forwarded to other locations within the financial institutions own franchise. Transit items are checks drawn on other financial institutions, and are pocketed for delivery to those institutions. In some financial institutions, items can also be sorted to "truncation pockets" (not shown) for items to be stored for a retention period and then discarded in accordance with new practices allowing an image rather than physical items be used as long-term documentation of a transaction.

The data correction process, 108, also results in items eventually being sorted into corrected, on-us items 116, and corrected, transit items, 118. Items from the high-speed process are then merged, eventually, with items from the correction or "reject repair" process at block 120. Thus, both the reject items and the good items, are typically eventually sorted to their destinations, shown consolidated at blocks 122 and 124.

It should be noted that the process shown in FIG. 1 may include both a "prime pass" a subsequent pass, also called a "subpass" or a "rehandle," if on us or especially transit items need to ultimately pocket into more physical pockets than are available on the sorting equipment. For example, if items need to pocket into, say, 50 transit item pockets for 50 different destination banks, and a sorter only has 30 pockets available for transit items, a subpass or rehandle is needed. In such a case, for example, some items might first be pocketed into a pocket that covers multiple destinations such as all the banks in a certain state or region. Then, the sorting process is repeated on these items to finally separate them into individual pockets destined for each bank. Errors can occur and the correction process can be invoked on either the prime pass or the subpass.

In a typical financial institution, large numbers of MICR items must go through the correction process, since any error in the read of any field causes an item to sort to a reject pocket. In many cases, the correction process includes the use of check mender equipment to place correction strips on the bottom of each document so new, readable MICR can be placed on each document. The resulting delay considerably reduces the processing time for each batch of MICR items processed by a financial institution.

SUMMARY OF INVENTION

The present invention, disclosed herein by way of example embodiments, can improve the processing time for large numbers of MICR encoded documents within a financial institution. Through use of an embodiment of the invention, the number of items which are pocketed as rejects due to digit errors can be significantly reduced. This reduction can be accomplished due to the realization that only the routing/transit field from the MICR data of an item needs to be read correctly in order for it to be properly pocketed. Additionally, speed and efficiency of handling documents with exceptions can be improved. Correction for documents which are pocketed as rejects due to digit errors is improved through the use of an image based correction process which can be referred to herein as MICR image correction or "MIC." Embodiments of the invention can also be used to correct image data received electronically when paper documents have been scanned elsewhere. Embodiments of the invention can additionally be used to process documents with other exceptions, such as a dollar amount that is above a threshold parameter.

According to some embodiments of the invention, a method of processing a MICR encoded document and/or its image, where the document is subject to an exception that may be related to a stored data field includes the receiving of an image of the document. The document can be routed to a destination subject to a determination that the exception does not prevent the routing of the document. A verification process can be performed on at least one portion of an image of the document, wherein the at least one portion will typically correspond to stored data related to the exception. A correction can be applied to a stored data field based at least in part on the verification process. In a prime pass, this correction can involve the MIC process, or other exception handling. In some embodiments, however, a master file is maintained to store information about corrections applied, and the master file can be used to make corrections in subsequent passes of the same items.

In some embodiments, exceptions such as digit errors in stored data fields can be corrected by an optical character recognition (OCR) process that is performed on the stored, electronic image. The portion of the document to which the OCR process is applied corresponds to the stored data field. For example, if the error is related to an account number, the OCR process is performed on a snippet of the document that includes the account number. Note however, that in such a case, a process according to an embodiment of the invention can include routing the document to a destination pocket and subsequently to a destination subject to a determination that the exception(s) or error(s) do(es) not prevent the routing of the document. In typical embodiments, an error or other exception does not prevent the routing of the document if it is not related to the routing/transit field. Embodiments of the correction process can be applied to image data received from another institution which scanned the MICR documents.

In the case of digit errors, the OCR process result is used to apply a correction to the error in the stored data field. This correction can be based on a comparison of the result of the OCR process and the digits within the stored data field which have been captured, albeit only partially or incorrectly. If a determination is made that the correction cannot be successfully determined by the comparison with the result of the OCR process, the image and MICR data is displayed on a user terminal, for manual correction, albeit by reference to an image of the document, rather than the document itself.

In some embodiments, an improved correction process can be applied when an error appears in a stored data field which has two or more corresponding areas within the image of the item. For example, if the error is in an amount, two results of an OCR process can be used. One result can be obtained from optically scanning the MICR line, and another result can be obtained from optically scanning a written amount. In some cases, still another OCR process result can be obtained if the amount is listed both numerically, and written out.

In some embodiments, exceptions can be defined programmatically. For example, an exception can be defined for when the dollar amount of an item exceeds a pre-selected threshold parameter. Such an item can then be verified using its image. This verification can be accomplished either using the MIC process and treating the item as if the amount has an error, or by immediate, operator verification.

A system for processing MICR encoded documents according to embodiments of the invention can include a sorter to sort and read the documents and route documents to a destination pocket when an exception condition does not prevent the routing. Such a sorter can be operatively interconnected with a computing platform to provide, among other elements, the OCR processing and apply corrections to the error in the stored data field based on a comparison of the result of an OCR process and the data in the stored field. The computing platform can also provide for the storage and routing of the images for manual verification and/or correction at user terminals as required.

Computer program instructions, computer programs or computer code, possibly in the form of a computer program product can implement portions of the invention. These computer program code instructions can operate a computing platform which controls a sorter and other hardware within the system. With such a system, the handling of physical items in order to process exceptions or perform reject repair can be reduced or eliminated. Furthermore, many items having exceptions, specifically exceptions which do not prevent the routing of the items, can be routed to a destination and any verification or correction required, whether automated or manual, can be performed using only the images of the items. Additionally, data referring to documents that were scanned elsewhere can be verified and/or corrected. Thus, overall check processing time can be reduced.

BRIEF DESCRIPTION OF DRAWINGS

FIG. 2B is a flow diagram which illustrates the processing of items according to embodiments of the invention.

FIG. 3B is a flowchart which illustrates further details of a method of processing items according to some embodiments of the invention.

DETAILED DESCRIPTION

Figure 1:
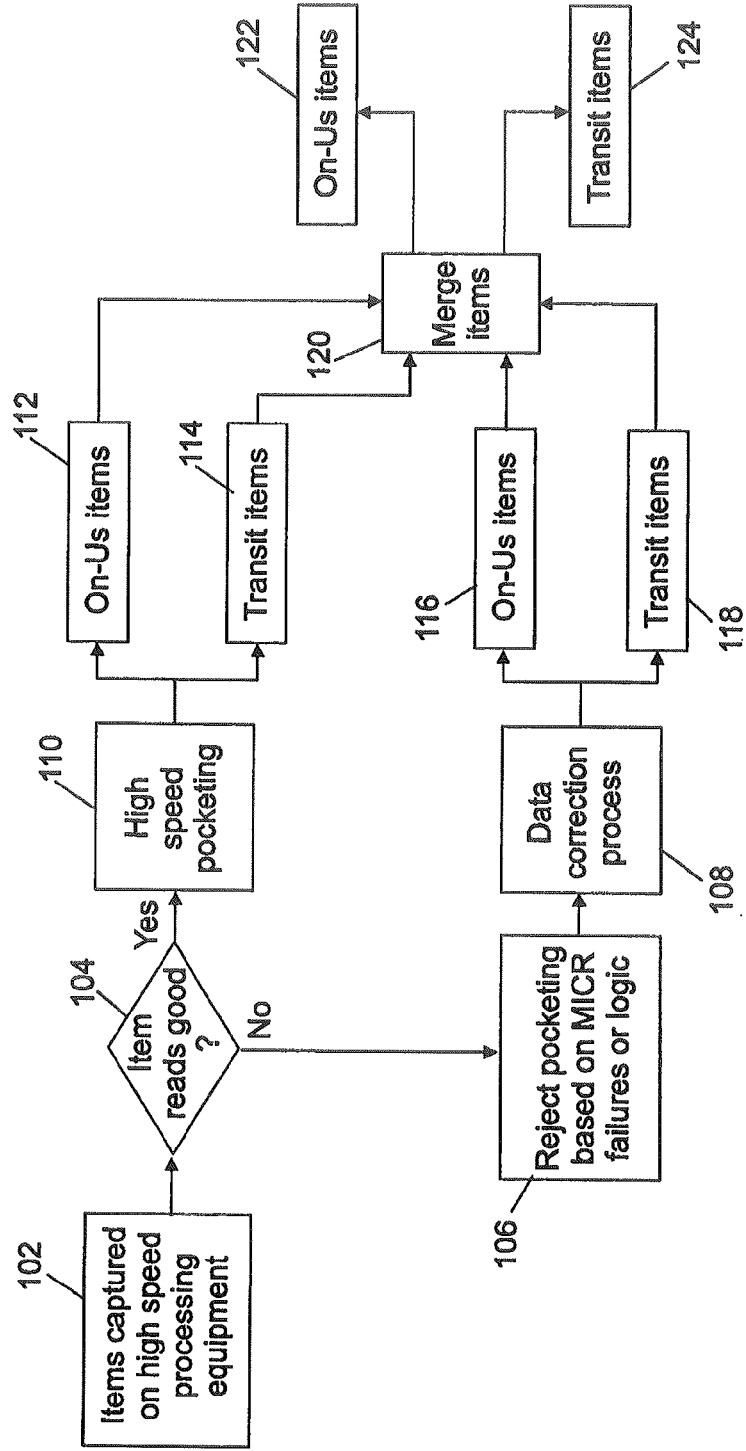
FIG. 1 is a flow diagram which illustrates a process in which all MICR encoded items having MICR failures or other errors are routed to a reject pocket for a physical data correction process.

The present invention will now be described in terms of specific, example embodiments. It is to be understood that the invention is not limited to the example embodiments disclosed. It should also be understood that not every feature of the methods and systems described is necessary to implement the invention as claimed in any particular one of the appended claims. Various elements and features of various embodiments are described to fully enable the invention. It should also be understood that throughout this disclosure, where a process or method is shown or described, the steps of the method may be performed in any order or simultaneously, unless it is clear from the context that one step depends on another being performed first. With respect of flowcharts, block diagrams and flow diagrams, not every possible signal flow, data path, or process block is shown. Rather, for clarity, only those important to the inventive concepts being discussed relative to the drawing may be illustrated, although others may be discussed in this description.

The meaning of certain terms as used generally in the context of this disclosure should be understood as follows. Terms such as "document" or "MICR encoded document" and the like are meant to refer to any document which tends to be handled and sorted in large volumes based on MICR information printed thereon. In the typical context, such documents are checks which order a bank to pay a certain sum to the order of another individual or entity. However, other documents evidencing financial transactions relating to banking, and for that matter, other kinds of documents, can be "MICR encoded documents." Even in the typical banking context, deposit slips are sometimes MICR encoded, read and sorted in a fashion similar to checks.

Terms like "bank" and "financial institution" are used herein in their broadest sense. Financial institutions that process transactions and documents of the types discussed can include stock brokerages, credit unions, and other types of institutions which are not strictly "banks" in the historical sense. The use of terms such as "bank" or "financial institution" herein is meant to encompass all such possibilities.

References will be made at various places within this disclosure to information contained in a "stored data field" or information within such a field being "corrected." As previously discussed, this terminology refers to the idea of correcting information about MICR encoded documents which is stored in data structures for retrieval and manipulation. There are many ways to design a system to accommodate the storage of this information, as well as the storage of electronic images of documents such as checks. Reference will be made herein to updating strings and user bytes which either are or refer to such fields in systems which process MICR documents such as checks. In example embodiments, this terminology refers to information stored in what is commonly known as a "check image management system" (CIMS) and within a "check processing control system" (CPCS). Such systems are well known within the banking industry by those who work in the financial data processing fields. Such data processing systems have historically been produced by the International Business Machines Corporation and marketed to banking and financial companies. Through the use of such systems, check images and index information referring to the check images, which typically includes the MICR data, can be stored in a single file according to an industry standard "check image export" (CIE) format. CIE has been used for many years by many banks to archive check images for their own internal use. Images and index information in such a system can be stored in the same file or separated. In some environments, the index information is separated and stored in an electronic cash letter (ECL) for communicating between financial institutions for the purpose of settlement. Index information can also be stored with electronic images in an "image cash letter" (ICL) to provide for the truncation of the paper documents. Again, these systems and techniques are well known by those of ordinary skill in the financial information technology arts.

In many places in this disclosure reference is made to an "exception" as in the case of "exception processing" or the like. What is meant by the term exception is any condition occurring when a document is processed that causes a verification process to take place as described herein. A verification process can be synonymous with a correction process as in many cases, this exception will be a MICR digit read error. However, embodiments of the present invention provide for other exceptions to be defined programmatically. In the examples discussed, high-dollar items, relative to a pre-set threshold amount, can be defined as exception items and verified or corrected in the same manner as if there were a read error in the amount of the item, for example, if there were a desire to verify checks from certain drawers or to certain payees. In such a case, many items may in fact be correct, but a verification process is used in part to determine this with relative certainly.

Figure 2A:
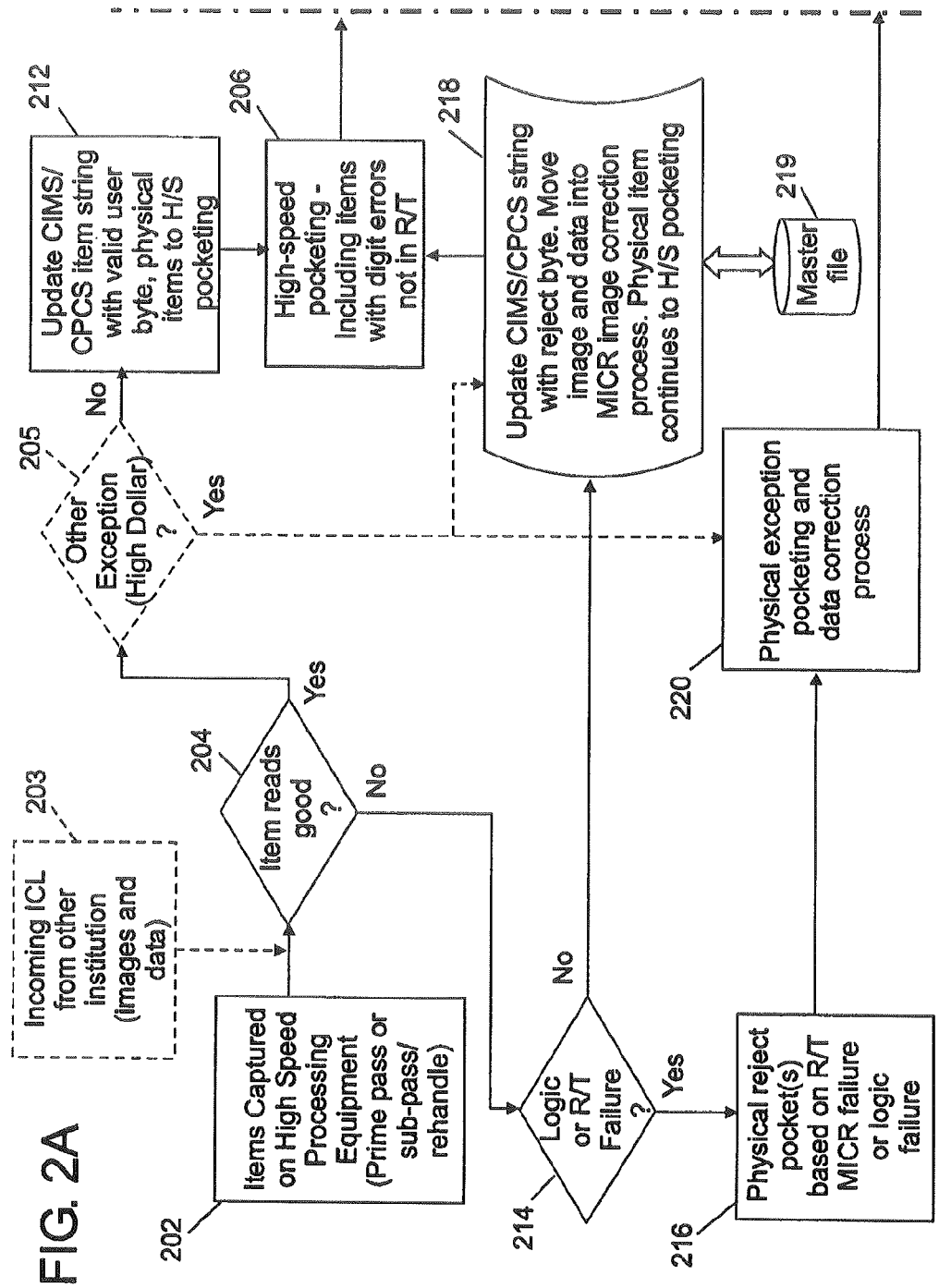
FIG. 2A is a flow diagram which illustrates the processing of items according to embodiments of the invention.

FIG. 2A and FIG. 2B are flow diagrams and process diagrams which illustrate the flow, 200, of items according to some embodiments of the invention FIG. 2A and FIG. 2B also show some of what happens to stored MICR data according to some embodiments of the invention. Further detail on how the data is handled is covered in FIGS. 3A, 3B, 4, and 5. At block 202 of FIG. 2A, MICR encoded items are loaded into a high-speed processor. As before, the processor reads the MICR data and the data is transferred to a file for storage. On at least the prime pass, an item is endorsed, an image is created and stored, and in some cases, a photographic image is made for microfilm purposes. Block 203 represents an incoming image file from another financial institution. The logic for the correction process is the same as with paper processing. An image file would be processed in a single pass. The incoming information may only be electronic as the future of check processing changes from paper to image. The MICR data for the images as captured by the sending bank may still contain MICR digits errors from the sending bank MICR capture equipment. The correction process will still follow the logic as described in FIG. 2A and FIG. 2B using the same image and image technology, only without on-us paper and without any transit images or items.

Blocks 204 and 205 of FIG. 2A together determine whether the items qualify for automated exception processing. As before, a determination is made at block 204 as to whether the item reads or was read as good. If the item reads good, a determination is made at block 205 as to whether it should be handled as a programmed exception. In this example, the exception would be that the value of the item exceeds a pre-set threshold parameter. If the item exceeds the parameter, it is treated as a reject and the image is assigned a reject user byte. At this point, if desired, it can be handled by the MIC process described herein and further discussed below. Alternatively, it can be immediately sent for manual correction by essentially treating it as a physical reject. This may be desired, for example, if mishandling of high-dollar items were viewed as a significant risk. These alternative processing paths are shown in FIG. 2A by dashed lines. In any case, if a locally sorted paper item reads good, it is pocketed at block 206. Pockets in the example of FIG. 2A eventually break down into a sort of items into on-us items at block 208, and transit items at block 210. In some systems items can also be pocketed into truncation pockets (not shown). In the example of FIG. 2A, good items also cause a valid user byte to be generated in the CIMS/CPCS system at block 212.

In process 200 of FIG. 2A, a determination is made at block 214 as to the type of error, which occurred during the read of an item. In the case of a logic failure related to a locally sorted paper item, the item is routed to the traditional physical reject process which commences at block 216 and the item is assigned a reject user byte. If a digit error has occurred, that is an error in which a digit within a field was not able to be read, the item is again routed to the physical reject process if the error occurs in the routing/transit (R/T) field and the item is assigned a reject user byte. In such a case, the item cannot be sorted since the R/T field determines the final destination of the item. However, if the digit failure or digit error occurs in any other fields related to the MICR encoded document, the item can still be sorted and pocketed at high-speed. Thus, if the error as determined at block 214 is found not to be a logic or routing/transit failure, the item is sorted into a pocket at block 206, in the same manner as a good item. An on-us or transit reject user byte will then be assigned to the item indicating the item has sorted good, but needs further attention for corrective purposes.

At block 218 of FIG. 2A, the MICR image correction process takes place. The process can be the same regardless of where the paper item was first read and sorted, and regardless of whether the item is in its prime pass or a subpass. This process can also be used to verify programmed exceptions, such as high-dollar items, by treating them as if they had a digit error. Thus, it may still be referred to as a correction process. CIMS/CPCS systems will recognize all the items that have a on-us or transit reject user byte. It is or was known at this point into which pocket the item needs to be or has been sorted, since the information needed to sort the item is generally determined from the routing/transit number. Thus, in the case of locally sorted paper items, at the end of the high-speed sort, items are pocketed as on-us items, 208, which include good on-us items and on-us rejects, and transit items, 210, which include good transit items and transit rejects. In some embodiments, as previously discussed, a truncation pocket will include good truncated items and truncation rejects, as embodiments of the invention can be applied to items to be truncated as well as to transit and on-us items.

Master file 219 can be created and accessed as part of the MIC process. A master file for a particular unit of work (UOW) is created when a MIC process is initiated on the prime pass. The file is updated each time a transit or any other type of item which will be rehandled is corrected through the MIC process. The information stored in the master file, including any indexing, MICR data, and sequence numbers will be stored until the subpass, where the same rejects, and possibly new rejects will typically be encountered. At this point, the rehandle rejects are reviewed and the master file is checked to determine if each reject was previously rejected. If so, the item is corrected using the original MIC information from the master file. If not, or if there is a failure to access the information, the rehandle reject will go through the same MIC correction process that a prime pass reject goes through. Note that there can be multiple subsequent passes or rehandles for a unit of work, in which case a second or third rehandle will have access to data in the master file not only from the prime pass, but also from previous subpasses.

As in the prior art, paper rejects are handled with a physical exception pocketing and correction process at block 220. This process can be used to correct paper rejects, or to verify exceptions, such as for high-dollar items, which were routed here after processing at block 205. This process results in on-us items pocketed at block 222 and transit items pocketed at block 224. In each case, these items will now have good data stored within CIMS and CPCS. These items are merged with the high-speed sorted items at block 226. Once the process has been completed for a batch of MICR encoded documents, the documents are stored in on-us pockets 228 and transit pockets 230, where in each case the physically pocketed items include both good items and reject items. The documents can now proceed to their destinations and any MICR data correction necessary can be provided through the high-speed MICR image correction process according to embodiments of the invention. It should be noted that in the case of transit items, MICR data is frequently exchanged via an electronic cash letter in parallel with the presentment of paper documents. Thus, a financial institution to which transit items are to be presented will be able to identify and acquire the correct MICR information notwithstanding the fact that the paper documents may not read error free.

Figure 3A:
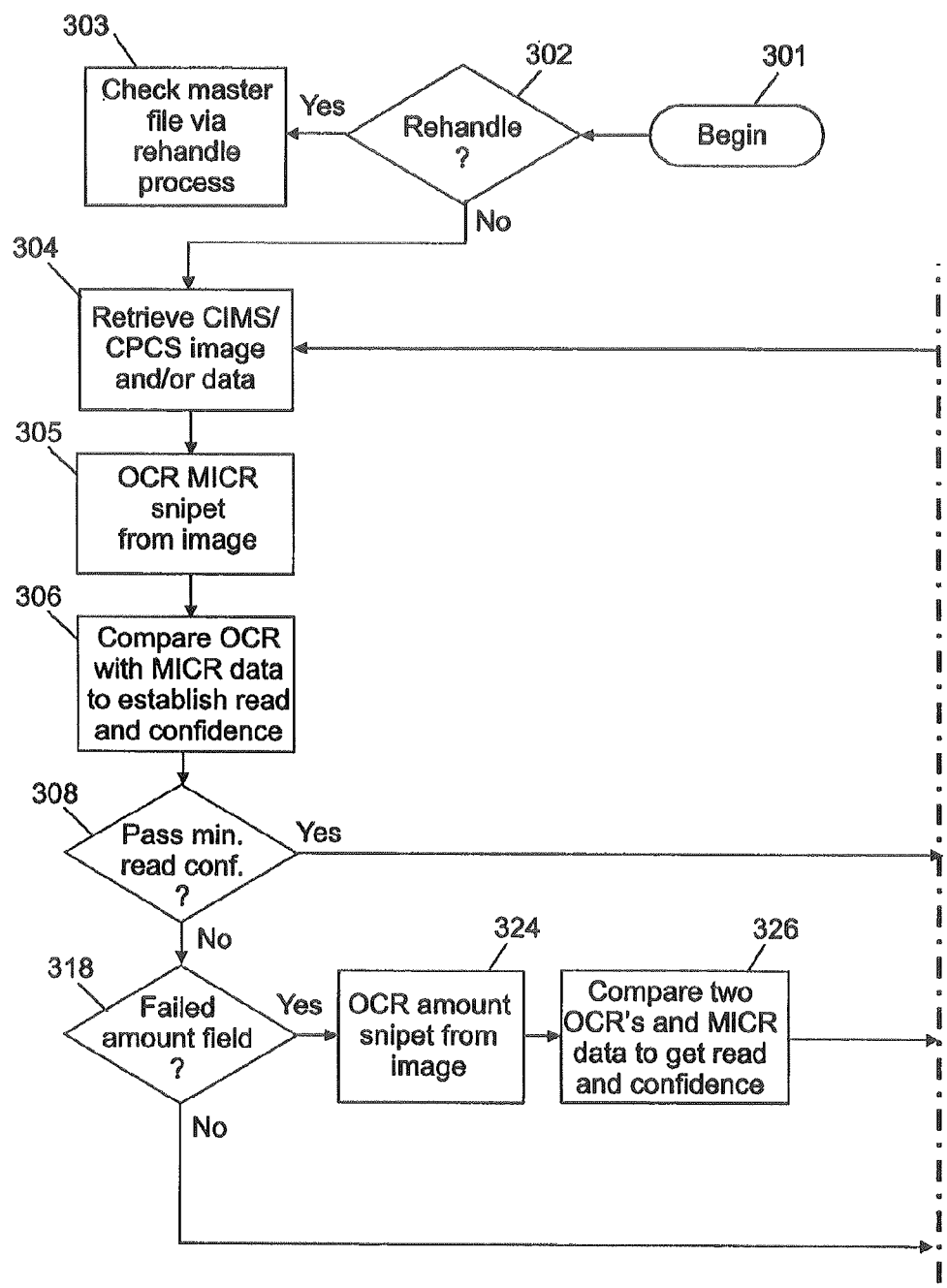
FIG. 3A is a flowchart which illustrates further details of a method of processing items according to some embodiments of the invention.

FIG. 3A and FIG. 3B are flow charts illustrating a process, 300, for MIC reject repair in an example system based on CIMS and CPCS. The data fields being repaired can correspond to paper items that were first sorted either locally, or at another institution. The process begins at block 301. At block 302, a determination is made as to whether the current pass is a prime pass entry reject or a rehandle entry reject. If a rehandle, processing proceeds to block 303, which specifies the process detailed in FIG. 4, discussed below. If prime pass, processing proceeds to block 304. At block 304 the appropriate image and MICR information is retrieved from CIMS and CPCS. This MICR information includes the various stored data fields, and what in CIMS and CPCS parlance is referred to as a "string" that includes a "user byte." In example embodiments of the invention, the string designates an item as valid, as an on-us reject, as a transit reject. The string can also designate the item as simply a reject if it is a paper reject requiring paper reject processing in the manner of the prior art. At block 305 an optical character recognition process is performed on a snippet from the image. On a first pass, in example embodiments, this snippet is at least one portion of the image, the portion which includes the MICR printed numbers which correspond to the stored data field in question. The OCR process reads the snippet optically, as opposed to with a MICR read head. At block 306, the result of the OCR process is compared with the MICR data in the stored data field to determine the likely, correct content of the field. This determination can be made in such a way that the probability that the field is actually supposed to be what is determined can be assigned a confidence level.

A system according to embodiments of the invention can be set up to test for a certain minimum confidence level as shown at block 308, before allowing a correction to be applied to the stored data field. In effect, the validity of the correction proposed is subject to having been successfully determined by the comparison, within a given confidence. This forces the system to only allow the MIC error correction if there is a substantial likelihood that the error correction will be successful in that the correct contents of the stored data field will be determined and restored. In some embodiments, required confidence levels can be set by the operators of a system. Assuming the minimum read confidence level is passed at block 308, a reject repair string based on the comparison of the OCR result and the data in the stored field is updated at block 310. It should be noted that in the rehandle process, a failure to match an item against the master file will result in correction as if the item was a prime pass item, at block 310, as will be understood through the fact that the MIC correction process is referenced in FIG. 4, discussed below. At block 312, the process repeats if there are additional errors to be corrected. If not, as in the case where all needed reject repair items have been corrected, the image repair string(s) are merged with the MICR data at block 314. In example embodiments, all the corrected MICR data is then merged into CIMS/CPCS at block 316.

If the minimum read confidence level is not achieved at block 308 of FIG. 3A, a test is made at block 318 to determine if the stored data field with the failure corresponds to the amount field for the item. If not, the image and the failed MICR data are sent to a workstation for image-based repair at block 320. A repair string is updated based on operator keying at block 322. The process then returns again to block 312 where it repeats if there are additional items to be corrected. Note that in this case, an operator only needs to correct one item at a time, and furthermore works with an image of the document rather than the document itself. Thus, within the steps shown in FIG. 3A and FIG. 3B, working with paper rejects has been completely eliminated.

Returning to block 318, if the error or failure is in an amount field, at least one additional OCR process result is obtained from a portion of the image at block 324. Thus, at least two portions of the image have an OCR process performed for a comparison of the result of an OCR process with the contents of a stored data field when the field corresponds to an amount. In this example embodiment, the OCR process is performed on the printed MICR and on a written, numerical amount. All three of these pieces of information can be compared at block 326. Note that depending on the OCR algorithms and processes used, in most cases it is possible to perform an OCR process on a written out amount as well as a printed numerical amount. This would involve at least three portions of the image having OCR results that can be compared with data in a stored field. In any case, the comparison is again used to determine how to correct an error in the stored field. At block 328, the result arrived at by this comparison is also checked against a minimum read confidence level. If the minimum level is achieved, the reject repair string data is updated at block 310. Otherwise, the image is sent to a workstation for image-based repair at block 320, as previously described.

Any of various known OCR algorithms can be applied to the process described in FIG. 3A and FIG. 3B to achieve the desired result. Specific OCR products are available that have been designed to optically determine and read printed MICR characters, handwriting, printed amounts, etc. It is also known how to compare the results of more than one algorithm, or the results of an algorithm with stored values and make determinations within certain confidence intervals. One way of accomplishing this is via a voting algorithm. Optical character recognition is a mature art and it is readily understood in the data processing arts how to apply it to achieve various results. Various companies produce OCR products and systems for varied applications, for example, ScanSoft, Inc. of Massachusetts, in the United States.

Figure 4:
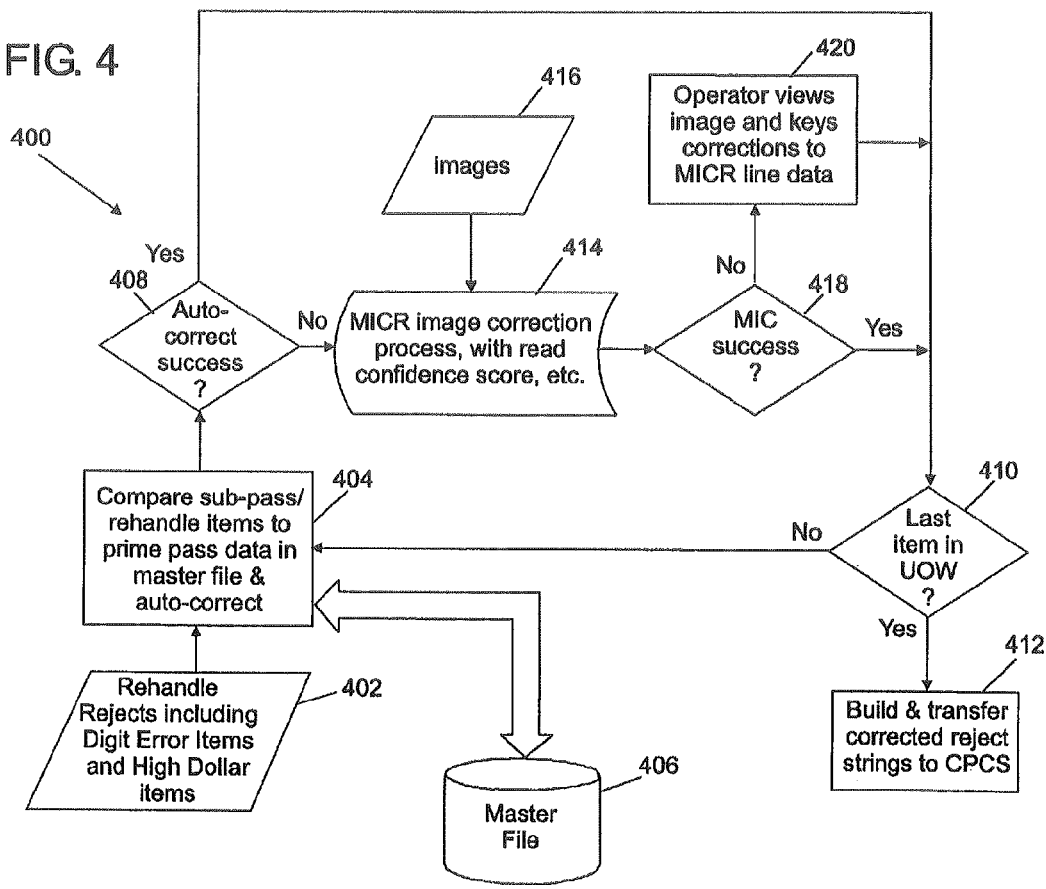
FIG. 4 is a flowchart which illustrates a method of subpass or rehandle processing of items according to some embodiments of the invention.

FIG. 4 illustrates a rehandle, subsequent pass, or "subpass" process, 400, according to example embodiments of the invention. Each rehandle exception item, including digit error rejects other exceptions, for example, high-dollar items, are input to the process as shown at block 402. At block 404, the item is compared with the data in master file 406 in an attempt to auto-correct by updating a stored data field related to the exception using data from the prime pass (or a previous subpass). If the auto-correct process is successful at decision block 408, processing branches to block 410, where a determination is made as to whether the item is the last item in the unit of work. If so, corrected strings are built in CPCS at block 412 and the process ends. If not, processing branches back to block 404 where another auto-correct is attempted on the next item in the unit.

If auto-correction using master file 406 fails at block 408, the item goes through the regular MIC error correction process at block 414, just as it would if it was a prime pass item. Correction is handled using stored images, 416. If the MIC process fails, or cannot be used at block 418, just as for prime pass items, the image is forwarded to a terminal at block 420, as before. In either case, processing then branches to block 410 for a determination as to whether the unit of work is complete. It should be noted that in the case of exceptions such as high-dollar item exceptions, processing can be routed, if desired, to immediate manual review at a user terminal, just as described with respect to FIG. 2A and FIG. 2B.

Figure 5:
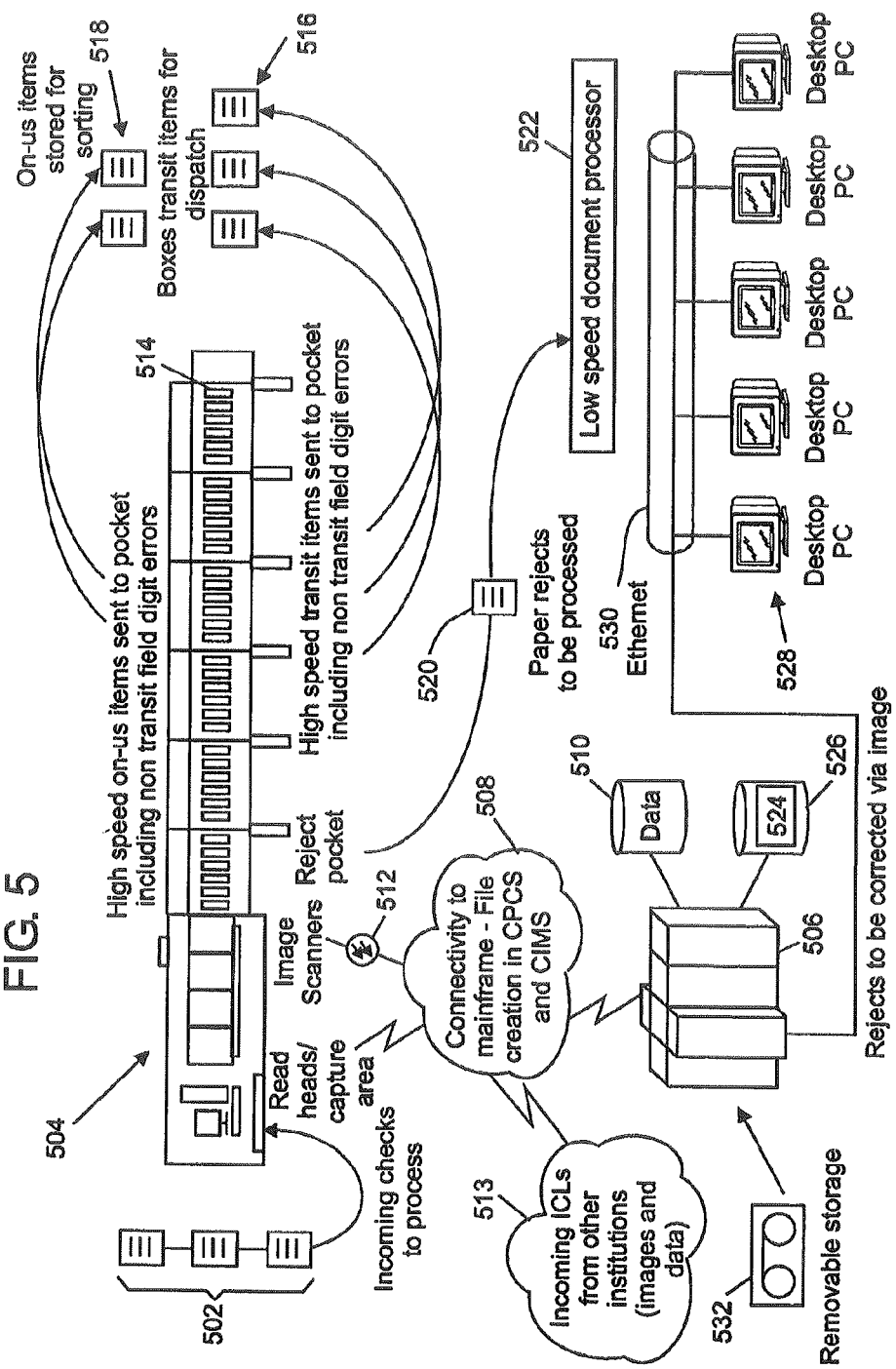
FIG. 5 is a block diagram of a system which handles MICR encoded items according to some embodiments of the invention.

FIG. 5 presents a system and network block diagram, which illustrates the operating environment for at least some example embodiments of the invention. Incoming paper items, in this case checks, are shown at 502. The documents are sorted and read at a high-speed sorter, 504. The checks pass through a capture area where read heads capture the MICR data and organize it into stored data fields. This data is transmitted to computer system 506 via connectivity 508. This connectivity can be provided by any of various types of networks, for example, System Network Architecture (SNA), an internal Internet protocol (IP) network, or a local area network (LAN). Computing system 506 stores the MICR data, master files, and other required information on fixed storage media 510.

In the example of FIG. 5, electronic images 512 are captured, forwarded to the computing system and stored. In the case of image cash letters, an image file 513 with string data and on-us items only would simply be presented to the bank for settlement. No paper would physically be exchanged. In this case, all activity resides (data and images) only in the computer based portion of FIG. 5. High-speed sorter 504 sorts all items which can be sorted, and routes the items into pockets 514. The sorted items include items with digit errors, as long as the digit errors are not in the routing/transit field. The sorting process allows items to eventually be packaged for movement to appropriate areas. In the example of FIG. 5, boxed transit items are shown at 516 and boxed on-us items are shown at 518. Boxed truncation items (not shown) can also be included. Items which cannot be routed, for example paper reject 520, are routed to a low-speed document processor, 522, for processing as a paper reject. Note that items that have been sorted for delivery to appropriate destinations, 516 and 518, can now proceed through the normal process, while the data is corrected using techniques based in computing system 506 and images stored in fixed storage 510. The techniques previously discussed relative to creating repair strings based on optical character recognition results and comparisons are directed and controlled by computer program code 524, at least in part stored in and read from fixed storage 526. Note that in order to handle cases where minimum confidence levels cannot be met by the OCR based algorithms, a number of operator terminals, 528, are interfaced to computer system 506 by Ethernet 530.

It cannot be overemphasized that the system of FIG. 5 is provided as an illustrative example only. There are numerous types of document sorting machines that can be used to provide the sorting/capture/imaging functions. Most sorters typically have conventional document diverting mechanisms which route the documents to the various pockets. Sorting instructions to cause the documents to be routed are received from a processor within the sorting machine, or from an external computing platform, or sometimes both depending on the particular operations being carried out at any particular time. The computing platform can be a mainframe, server, workstation, and even a desktop or personal computer given the processing power that has been achieved in such devices in recent years.

In any event, some embodiments of the invention can be implemented through extensive use of computer program products, or computer program instructions to carry out methods according to the invention. These instructions in combination with a computing platform processor and other devices form the means to carry out embodiments of the invention. These computer program instructions may be part of a computer program or multiple programs which are supplied as a computer program product. Such a computer program product may take the form of a computer readable media that allows computer program instructions to be loaded into computing platforms. In the example operating environment of FIG. 5, a computer program product in the form of a medium containing the appropriate instructions is shown as removable storage medium 532.

In addition to being supplied in the form of a machine readable medium or media, computer program instructions which implement the invention can also be supplied over a network. In this case the medium is a stream of information being retrieved when the computer program product is downloaded. Computer programs which implement embodiments of the invention can reside on any medium that can contain, store, communicate, propagate, or transport the program for use by or in connection with any computing platform or instruction execution system, apparatus, or device. The medium may be, for example but not limited to, an electronic, magnetic, optical, electromagnetic, infrared, or semiconductor system or device. For example, the computing platform, storage mediums, connectivity, and sorting machine, can all be combined into one large device and the computer program instructions could be stored within an optical, magnetic, or electronic module type storage devices.

In order to more fully enable the present invention, the following details are presented on how strings within a CPCS system are updated and managed according to some example embodiments of the invention. As previously discussed, the invention can be implemented in other types of systems. Detail on CPCS and CIMS is presented as an example only. In an example CPCS system, good items that are sorted to pockets build an "I-String" within CPCS with a valid user byte. Items with digit errors that do not prevent sorting and all paper reject items build on the same "I-String" but, with other types of CPCS user bytes.

Items that are on-us with digit errors are sorted and build an "On-Us Reject String" within CPCS with an "On-Us Reject" user byte. Items that are transit with digit errors are sorted and build a "Transit Reject String" within CPCS with a "Transit Reject" user byte. Reject items, that is items that have digit errors in the routing/transit field or have other problems are sorted to a reject or "R" pocket for low speed processing and build a "Reject D-string" within CPCS with a user byte that signifies a paper reject. Thus, the CPCS entry will end and create four closed strings: I-String, On-Us Reject String, Transit Reject String and a Reject D-String.

Transit reject string specified images and data will download to the OCR process. Certain digit errors will be corrected via this process if the logic can correct a failed digit with a specified confidence level. Similarly, on-us reject string specified images and data download to the OCR process. Items with digits failing in the amount field will go through an additional OCR/MICR/written amount verification process to determine if handwriting, printed numbers, or both can create a good read. Images and data for remaining items will download to workstations for digit correction via key entry by an operator referencing an image rather than a paper document. In some embodiments, on-us items go through the process of the invention with a low priority compared to transit items.

Once all the transit rejects and/or all on-us rejects have been corrected for a specified entry, the "I-String" can be merged with a repair string(s) to create an "Adjusted I-String" or an "M-String" indicating the items have been corrected. In at least some embodiments, a final merge for all items in a batch waits until reject D-string specified items have been corrected. However, since employing an embodiment of the invention reduces the number of reject D-string items, the time involved in processing the batch is also reduced.

Specific embodiments of an invention are described herein. One of ordinary skill in the computing, networking, and financial information technology arts will quickly recognize that the invention has other applications and can be used in other environments. In fact, many embodiments and implementations are possible. The following claims are in no way intended to limit the scope of the invention to the specific embodiments described above.

What is claimed is:

1. A method for processing images of magnetic ink character recognition (MICR) encoded document, the method comprising:
   receiving a MICR encoded document, wherein an image of the MICR encoded document is captured;
   processing the MICR encoded document, including storing MICR data and the image of the MICR encoded document;
   identifying, during the processing, exception MICR encoded documents, wherein an exception is one or more of a MICR digit read error, a high-dollar error, or a programmed defined exception;
   performing an optical character recognition (OCR) process on at least one portion of an image of the exception MICR encoded document, wherein at least a portion of the image of the exception MICR encoded document substantially corresponds to stored MICR data;
   determining, via a computer device processor, if the OCR process on at least one portion of an image of the exception MICR encoded document passes an established minimum read confidence;
   applying, automatically upon passing the established minimum read confidence, a correction for the exception MICR encoded document; and
   merging a corrected exception MICR encoded document into the processing of MICR encoded documents.

2. The method of claim 1 further comprising routing the received MICR encoded document to a specific destination based at least in part on data determined during the processing of the MICR encoded document, wherein routing is not stopped for an identified exception MICR encoded document when the MICR encoded document can be corrected.

3. The method of claim 1 further comprising determining if at least one portion of the image of the exception MICR encoded document corresponds to stored MICR data prior to performing an OCR process on the at least one portion of the image of the exception MICR encoded document.

4. The method of claim 1, wherein applying, automatically upon passing the established minimum read confidence, a correction for the exception MICR encoded document further comprises applying the correction to the exception MICR encoded document using a comparison of a result of the OCR process and digits within the stored MICR data that have been captured, wherein the captured digits are correct, partial, or incorrect.

5. The method of claim 1 further comprising determining if additional errors are associated with the correction exception MICR encoded document prior to merging the corrected exception MICR encoded document into the processing of MICR encoded documents.

6. The method of claim 1 further comprising:
   determining if the OCR process on at least one portion of an image of the exception MICR encoded document fails the established minimum read confidence:

performing a second OCR process on at least two or more portion of a failed MICR encoded document, wherein one of the at least two or more portions of the failed MICR encoded document substantially corresponds to stored MICR data; and determining if the OCR process on the at least two portions of the failed MICR encoded document passes established minimum read confidence.

7. The method of claim 6 further comprising sending the failed MICR encoded document to an operator for image based repair based on a determination that the failed MICR encoded document does not pass the established minimum read confidence.

8. The method of claim 1 further comprising storing information about the corrected exception MICR encoded document and the stored MICR data into a master file to use to make corrections in subsequent processing of MICR encoded documents.

9. A system for processing images of magnetic ink character recognition (MICR) encoded document, the system comprising:

a memory device with computer-readable program code stored thereon;

a communication device; and a processing device operatively coupled to the memory device and the communication device, wherein the processing device is configured to execute the computer-readable program code to:

receive a MICR encoded document, wherein an image of the MICR encoded document is captured;

process the MICR encoded document, including storing MICR data and the image of the MICR encoded document;

identify, during the processing, exception MICR encoded documents, wherein an exception is one or more of a MICR digit read error, a high-dollar error, or a programmed defined exception;

perform an optical character recognition (OCR) process on at least one portion of an image of the exception MICR encoded document, wherein at least a portion of the image of the exception MICR encoded document substantially corresponds to stored MICR data;

determine if the OCR process on at least one portion of an image of the exception MICR encoded document passes an established minimum read confidence;

apply, automatically upon passing the established minimum read confidence, a correction for the exception MICR encoded document; and merge a corrected exception MICR encoded document into the processing of MICR encoded documents.

10. The system of claim 9, wherein the processing device is further configured to route the received MICR encoded document to a specific destination based at least in part on data determined during the processing of the MICR encoded document, wherein routing is not stopped for an identified exception MICR encoded document when the MICR encoded document can be corrected.

11. The system of claim 9, wherein the processing device is further configured to determine if at least one portion of the image of the exception MICR encoded document corresponds to stored MICR data prior to performing an OCR process on the at least one portion of the image of the exception MICR encoded document.

12. The system of claim 9, wherein applying, automatically upon passing the established minimum read confidence, a correction for the exception MICR encoded document further comprises applying the correction to the exception MICR encoded document using a comparison of a result of the OCR process and digits within the stored MICR data that have been captured, wherein the captured digits are correct, partial, or incorrect.

13. The system of claim 9, wherein the processing device is further configured to determine if additional errors are associated with the correction exception MICR encoded document prior to merging the corrected exception MICR encoded document into the processing of MICR encoded documents.

14. The system of claim 9, wherein the processing device is further configured to:

determine if the OCR process on at least one portion of an image of the exception MICR encoded document fails the established minimum read confidence:

perform a second OCR process on at least two or more portion of a failed MICR encoded document, wherein one of the at least two or more portions of the failed MICR encoded document substantially corresponds to stored MICR data; and determine if the OCR process on the at least two portions of the failed MICR encoded document passes established minimum read confidence.

15. The system of claim 14, wherein the processing device is further configured to send the failed MICR encoded document to an operator for image based repair based on a determination that the failed MICR encoded document does not pass the established minimum read confidence.

16. The system of claim 9, wherein the processing device is further configured to store information about the corrected exception MICR encoded document and the stored MICR data into a master file to use to make corrections in subsequent processing of MICR encoded documents.

17. A computer program product for processing images of magnetic ink character recognition (MICR) encoded document, the computer program product comprising at least one non-transitory computer-readable medium having computer-readable program code portions embodied therein, the computer-readable program code portions comprising:

an executable portion configured for receiving a MICR encoded document, wherein an image of the MICR encoded document is captured;

an executable portion configured for processing the MICR encoded document, including storing MICR data and the image of the MICR encoded document;

an executable portion configured for identifying, during the processing, exception MICR encoded documents, wherein an exception is one or more of a MICR digit read error, a high-dollar error, or a programmed defined exception;

an executable portion configured for performing an optical character recognition (OCR) process on at least one portion of an image of the exception MICR encoded document, wherein at least a portion of the image of the exception MICR encoded document substantially corresponds to stored MICR data;

an executable portion configured for determining, via a computer device processor, if the OCR process on at least one portion of an image of the exception MICR encoded document passes an established minimum read confidence;

an executable portion configured for applying, automatically upon passing the established minimum read confidence, a correction for the exception MICR encoded document; and an executable portion configured for merging a corrected exception MICR encoded document into the processing of MICR encoded documents.

18. The computer program product of claim 17 further comprising an executable portion configured for further comprising routing the received MICR encoded document to a specific destination based at least in part on data determined during the processing of the MICR encoded document, wherein routing is not stopped for an identified exception MICR encoded document when the MICR encoded document can be corrected.

19. The computer program product of claim 17 further comprising an executable portion configured for determining if at least one portion of the image of the exception MICR encoded document corresponds to stored MICR data prior to performing an OCR process on the at least one portion of the image of the exception MICR encoded document.

20. The computer program product of claim 17, wherein applying, automatically upon passing the established minimum read confidence, a correction for the exception MICR encoded document further comprises applying the correction to the exception MICR encoded document using a comparison of a result of the OCR process and digits within the stored MICR data that have been captured, wherein the captured digits are correct, partial, or incorrect.

21. The computer program product of claim 17 further comprising an executable portion configured for determining if additional errors are associated with the correction exception MICR encoded document prior to merging the corrected exception MICR encoded document into the processing of MICR encoded documents.

22. The computer program product of claim 17 further comprising:
an executable portion configured for determining if the OCR process on at least one portion of an image of the exception MICR encoded document fails the established minimum read confidence:
an executable portion configured for performing a second OCR process on at least two or more portion of a failed MICR encoded document, wherein one of the at least two or more portions of the failed MICR encoded document substantially corresponds to stored MICR data; and
an executable portion configured for determining if the OCR process on the at least two portions of the failed MICR encoded document passes established minimum read confidence.

23. The computer program product of claim 22 further comprising an executable portion configured for sending the failed MICR encoded document to an operator for image based repair based on a determination that the failed MICR encoded document does not pass the established minimum read confidence.

24. The computer program product of claim 17 further comprising an executable portion configured for storing information about the corrected exception MICR encoded document and the stored MICR data into a master file to use to make corrections in subsequent processing of MICR encoded documents.

\* \* \* \* \*